Patented July 25, 1939

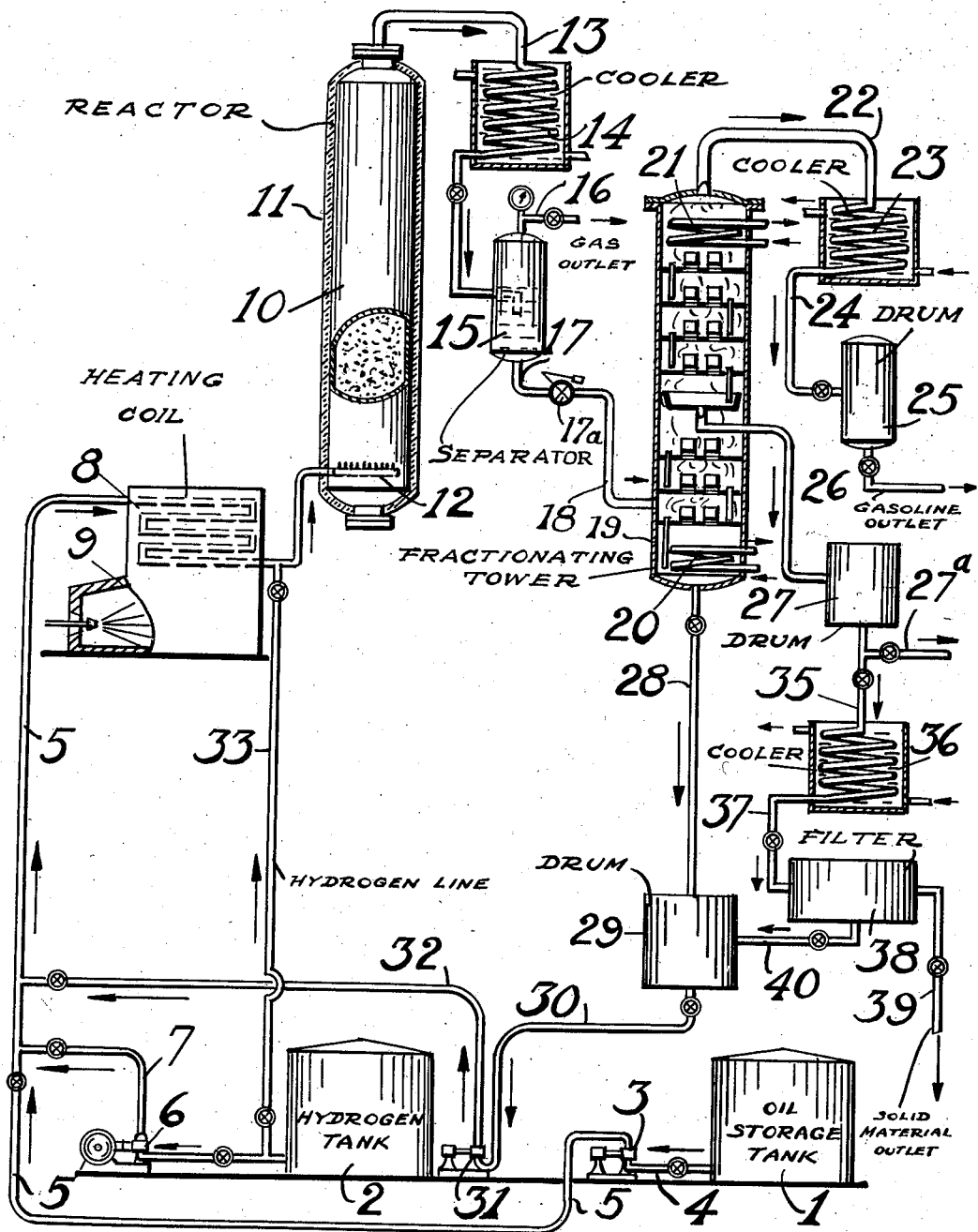

2,167,339

UNITED STATES PATENT OFFICE 2,167,339

HYDROGENATION OF CYCLIC HYDROCARBONS

William J. Sweeney, Westfield, N. J., assignor to Standard I. G. Co.

Application April 28, 1937, Serial No. 139,395

2 Claims. (Cl. 196—53)

This invention relates to the hydrogenation of aromatic or naphthenic hydrocarbon fractions and will be fully understood from the following description when read with reference to the accompanying drawing which is a semi-diagrammatic view in sectional elevation of a suitable type of apparatus and indicates the lines of flow of the various materials.

It has been observed that when hydrocarbon fractions of predominantly cyclic or naphthenic structure are subjected to destructive hydrogenation, appreciable quantities of a refractory solid material are formed. It is usual in such processes to recycle the heavier fractions of the product for further treatment and it is found that the solid material remains in the heavier recycled fraction and being highly refractory is not broken down but tends to accumulate in the cycle oil with the result that it gradually deposits in the condensers and cooling lines and eventually plugs them up completely making a shut-down necessary to clean out the apparatus.

The present invention is directed to a method of avoiding the accumulation of this solid material in the system.

The invention is particularly applicable to a process for the high temperature hydrogenation of selective solvent extracts of relatively low boiling hydrocarbon oils. A specific example of this type of process, is one in which a liquid $SO_2$ extract of kerosene is subjected to the action of hydrogen at a temperature of about 1000° F., under a pressure of about 200 atmospheres in the presence of a catalyst comprising oxides of metals of the 6th group of the periodic system such as molybdenum and tungsten. The quantity of hydrogen used is about 4000 cubic feet per barrel of oil. The product of this process is a highly aromatic or hydroaromatic hydrocarbon fraction boiling in the gasoline range.

Referring to the drawing, numeral 1 designates a supply tank of oil to be subjected to treatment with hydrogen. Numeral 2 designates a supply tank of hydrogen or gas rich in free hydrogen.

Pump 3 withdraws oil from tank 1 through line 4 and forces it through line 5. Compressor 6 withdraws hydrogen from tank 2 and forces it through line 7 which meets line 5 carrying oil to be treated. A mixture of oil and hydrogen is thereby formed and this is forced under high pressure into and through a heating coil 8 disposed in a suitable furnace setting 9 adapted to be fired by gas, oil or other suitable means. In coil 8 the mixture of oil and hydrogen is raised to a high temperature and is then discharged into reactor 10 which is adapted to be maintained under high pressure and at high temperature and is resistant to the action of the reacting materials under these conditions. A coating of insulating material 11 is preferably provided around the reactor. The reactor is filled with lumps or small pieces of a suitable catalytic material, the nature of which will be described below.

The hot mixture is introduced into the bottom of the reactor through a pipe 12 provided with a suitable series of openings.

The hot reaction products flow out of the reactor through line 13 and pass first through a cooler 14 and thence into a high pressure separator 15 where liquid products are separated from vapors and gases. The gases are removed from separator 15 through line 16 and the hydrogen may be recovered therefrom and re-used in the process. The liquid products are removed from separator 15 through line 17 which is provided with pressure release valve 17a at which pressure may be reduced substantially, and thence the products flow through line 18 into a fractionating tower 19 provided with a heating coil 20 and a reflux or cooling coil 21. The tower is also provided with suitable plates which may be of the bubble-cap or other suitable type.

The lowest boiling fraction of the product is removed in vapor form through line 22 and after being condensed in cooler 23 flows through line 24 and is collected in drum 25.

An intermediate boiling fraction which is found to contain most of the objectionable solid material formed during the process is withdrawn from the middle of the tower through line 26 and collected in drum 27. This fraction may be discarded by means of line 27a or alternatively may be passed through line 35 into a cooler 36, wherein the oil is cooled to a temperature about that of the cooling water which will be somewhat below atmospheric temperature, and thence passed through line 37 into a filter 38 wherein the solid material is removed and may be withdrawn through line 39. The filtrate may be recovered and passed through line 40 in drum 29 wherefrom it is recycled through the process.

The highest boiling fractions of the product collect at the bottom of tower 19 and may be withdrawn therefrom through line 28 and collected in drum 29. From drum 29, this fraction is withdrawn through line 30 and forced by means of pump 31 and line 32 to line 5 which carries the fresh oil into the heating coil.

Various alternative arrangements may be made as will be understood. Part or all of the hydrogen may be by-passed around the heating coil 6 and introduced directly into the reactor. This may be done by means of line 33 which is provided with suitable valves.

In the operation of the process the temperature in the reactor 10 is maintained above 950° F. and preferably between 1000 and 1050° F. The pressure is maintained above 20 atmospheres and may be as high as 50, 100, 200, 300, 500, 1000 atmospheres or even more.

The quantity of hydrogen used may vary from as little as 1000 cubic feet per barrel of oil to as much as 10,000 cubic feet. In the lower temperature range, say between 950 and 1000° F., the quantity of hydrogen should be between 2000 and 4000 cubic feet per barrel of oil. In the upper temperature range, say between 1000 and 1050° F., the quantity of hydrogen is preferably between 6000 and 10,000 cubic feet per barrel of oil.

The space velocity should be from 1.0 to 3.0 volumes per volume of reaction space per hour although lower or higher space velocities are not precluded. The higher space velocities would be used at the higher temperatures.

The catalyst provided in the reactor is preferably a sulfactive catalyst, that is to say, immune from poisoning by sulfur or sulfur-containing compounds. Oxides or sulfides of metals of the 4th to 7th group of the periodic system of elements may be used either alone or in combination with each other or with various carrying or supporting materials. Sulfides of the metals of the 6th group of the periodic system are preferred catalysts. Sulfides of molybdenum, tungsten, chromium, vanadium, etc. are examples. These may be used in combination with oxides or sulfides of elements of Group II of the periodic system such as zinc oxide, aluminum oxide and the like.

The amount of steam introduced at the bottom of the fractionating tower and the amount of reflux introduced at the top are regulated so that the vapors leaving the top of the tower, when condensed, have an endpoint between 400 and 410° F. This condensate is suitable for use as gasoline.

The intermediate fraction withdrawn and discarded should comprise the fraction boiling between about 410 and 435° F. It is found that this narrow fraction will contain substantially all of the solid refractory material formed during the reaction.

The final fraction which is recycled will contain everything boiling above about 435° F.

It will be understood that the gasoline and bottoms fractions may be separated still further into narrower fractions. The essential feature of the present invention is to remove the fraction boiling between about 415 and 435° F.

The type of initial materials to which the present process is particularly applicable are selective solvent extracts of petroleum fractions, refractory cycle gas oils, fractions of naphthenic base petroleum and gas oils obtained by the hydrogenation of coal, and in general any type of material which tends upon hydrogenation to form naphthalene.

This invention is not limited by any theories of the mechanism of the process nor by any details which have been given merely for purposes of illustration, but is limited only in and by the following claims in which it is intended to claim all novelty inherent in the invention.

I claim:

1. In a process for the destructive hydrogenation of liquid sulfur dioxide extract of lower boiling hydrocarbons, which comprises subjecting the extract to the action of hydrogen in an amount between 1000 and 10,000 cubic feet per barrel at a temperature between 950 and 1050° F. under a pressure of about 200 atmospheres and in the presence of a sulfactive catalyst, the improvement of preventing solid refractory material formed in the reaction from accumulating in the heat exchanger and cooling system which comprises separating from the reaction products from said process a hydrocarbon fraction boiling between 415 and 435° F., cooling said fraction to a temperature somewhat below atmospheric, filtering the fraction so cooled to remove the solid material consisting mainly of naphthalene and recycling the remainder of said fraction in the hydrogenation process.

2. In a process for the destructive hydrogenation of light refractory gas oils of naphthenic character wherein said gas oil is first admixed with hydrogen in a ratio of the order of 1000 to 10,000 cubic feet of hydrogen per barrel of oil, the mixture passed through a reaction zone containing a hydrogenating catalyst maintained at a temperature between about 950 and 1050° F. and under a pressure of the order of 200 atmospheres and the resulting products fractionated into a light distillate product of the desired boiling range, an intermediate liquid product boiling between about 415 and 435° F. and a higher boiling liquid product; the improvement which comprises recycling said higher boiling product to the reaction zone for further hydrogenating treatment, separating from said intermediate fraction a product solid under normal conditions and consisting mainly of naphthalene and returning the remainder of said intermediate fraction to the reaction zone.

WILLIAM J. SWEENEY.